(12) United States Patent
Yang et al.

(10) Patent No.: US 7,593,071 B2
(45) Date of Patent: Sep. 22, 2009

(54) BACKLIGHT MODULE

(75) Inventors: Zhao-Tang Yang, Hsin-Chu (TW); Chiao-Chung Huang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 346 days.

(21) Appl. No.: 11/560,818

(22) Filed: Nov. 16, 2006

(65) Prior Publication Data

US 2008/0019118 A1    Jan. 24, 2008

(30) Foreign Application Priority Data

Jul. 24, 2006    (TW)    ............... 95126953 A

(51) Int. Cl.
*G02F 1/13*    (2006.01)
*F21V 19/00*    (2006.01)

(52) U.S. Cl. ........................................ 349/65; 362/634

(58) Field of Classification Search ............ 349/65; 362/634
See application file for complete search history.

(56) References Cited

U.S. PATENT DOCUMENTS 6,867,827 B2 *   3/2005   Cha et al.   ............ 349/65

FOREIGN PATENT DOCUMENTS

| JP | 2001-356343 | 12/2001 |
| JP | 2004-212574 | 7/2004 |

* cited by examiner

*Primary Examiner*—Sarah Song
(74) *Attorney, Agent, or Firm*—Winston Hsu

(57) ABSTRACT

A backlight module is disclosed, in which the backlight module includes a lamp, a first wire electrically connected to a first end of the lamp, a second wire electrically connected to a second end of the lamp, and a lamp holder having a groove for supporting the lamp. Preferably, the second wire is fixed in the groove while extending from the second end of the lamp to the first end of the lamp.

10 Claims, 6 Drawing Sheets

BACKLIGHT MODULE

BACKGROUND OF THE INVENTION

1. Field of the Invention

The invention relates to a backlight module.

2. Description of the Prior Art

Liquid crystal displays are commonly utilized in various electronic products including cell phones, PDAs, and notebook computers. As the market demand for large-scale display panels continues to increase, liquid crystal displays having advantages such as small size and light weight have become widely popular.

Due to the fact that the liquid crystal display itself does not illuminate, a backlight module has to be installed under the liquid crystal display to provide an area light source for the liquid crystal display. Typically, a backlight module is composed of a plurality of lamps and a plurality of optical devices including diffuser films and prisms.

Backlight modules are commonly divided into two major categories: side-emitting type and direct type. The direct type backlight modules are positioned directly below the liquid crystal display panel and are able to provide a much stronger light source for the display. Hence, direct type backlight modules are often utilized in large-scale liquid crystal display panels, including computer display panels and panels for household televisions.

Please refer to FIG. 1. FIG. 1 is a perspective diagram illustrating a direct type backlight module 10 according to the prior art. As shown in FIG. 1, the backlight module 10 includes a frame 12, at least a lamp 14 disposed in the frame 12, and an optical assembly 16 positioned on an opening of the frame 12. The lamp 14 can be a cold cathode fluorescent lamp or an external electrode fluorescent lamp, and the optical assembly 16 is consisting of a light conducting structure, a diffuser film, a prism, or a combination of the above. The backlight module 10 also includes a reflector 18 disposed on an inner surface of the frame 12 for reflecting the light emitted from the lamp 14, thereby increasing the usability of the lights.

In general, the lamp from the conventional direct type backlight module is fabricated according to a module design, in which a backlight module typically includes a plurality of lamp modules. Please refer to FIG. 2. FIG. 2 is a perspective illustrating a lamp module 20 of a backlight module according to the prior art. As shown in FIG. 2, the lamp module 20 includes a lamp 22, a lamp holder 24 for supporting the lamp 22, a high voltage wire 26 electrically connected to a high voltage end 28 of the lamp 22, and a low voltage wire 30 electrically connected to a low voltage end 32 of the lamp 22.

The low voltage wire 30 of the lamp module 20 is extended from the low voltage end 32 to the high voltage end 28 of the lamp 22 and positioned adjacent to the high voltage wire 26 at the high voltage end 28. A heat shrinkable tube 34 is utilized to wrap the low voltage wire 30 and the high voltage wire 26 and affix the two wires with respect to a side of the high voltage end 28. Since the low voltage wire 30 is approximately one centimeter longer than the high voltage wire 26 after bending along the lamp holder 24 and fixed on one side of the lamp 22, the low voltage wire 30 will be easily pulled during the assembly process and result in breakage of the lamps 22 and malfunction of the display panel.

SUMMARY OF THE INVENTION

It is therefore an objective of the present invention to provide a backlight module to improve the aforementioned problems.

A backlight module is disclosed, in which the backlight module includes a lamp, a first wire electrically connected to a first end of the lamp, a second wire electrically connected to a second end of the lamp, and a lamp holder having a groove for supporting the lamp. Preferably, the second wire is fixed in the groove while extending from the second end of the lamp to the first end of the lamp.

The present invention specifically forms a groove within the lamp holder of the backlight unit and utilize the groove to accommodate a low voltage wire of the lamp while the wire extends from a low voltage end to a high voltage end of the lamp, in which the low voltage wire is fixed corresponding to the central location of the lamp holder. By utilizing the design of the groove, the present invention is able to prevent the low voltage wire from being pulled during the assembly process and result in serious problem such as lamp breakage and panel malfunction.

These and other objectives of the present invention will no doubt become obvious to those of ordinary skill in the art after reading the following detailed description of the preferred embodiment that is illustrated in the various figures and drawings.

DETAILED DESCRIPTION

According to the preferred embodiment of the present invention, a backlight module having a frame, a plurality of lamp modules disposed in the frame, and an optical assembly disposed with respect to an opening of the frame is disclosed. The optical assembly is consisting of a light conducting structure, a diffuser film, a prism, or a combination of the above. The backlight module may also include a reflector disposed on an inner surface of the frame for reflecting the light produced by the lamp module.

Figure 1:
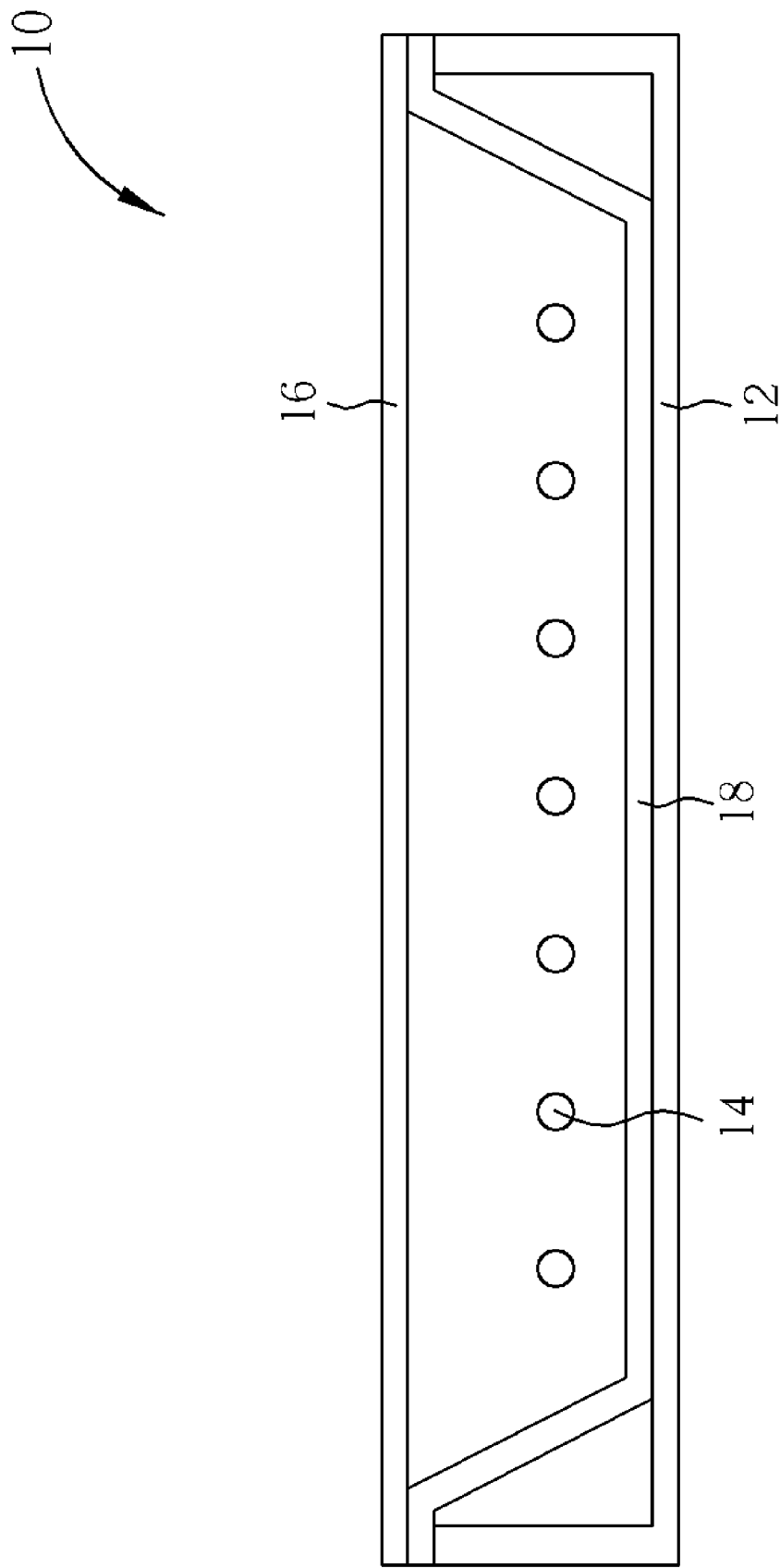
FIG. 1 is a perspective diagram illustrating a direct type backlight module according to the prior art.
Figure 2:
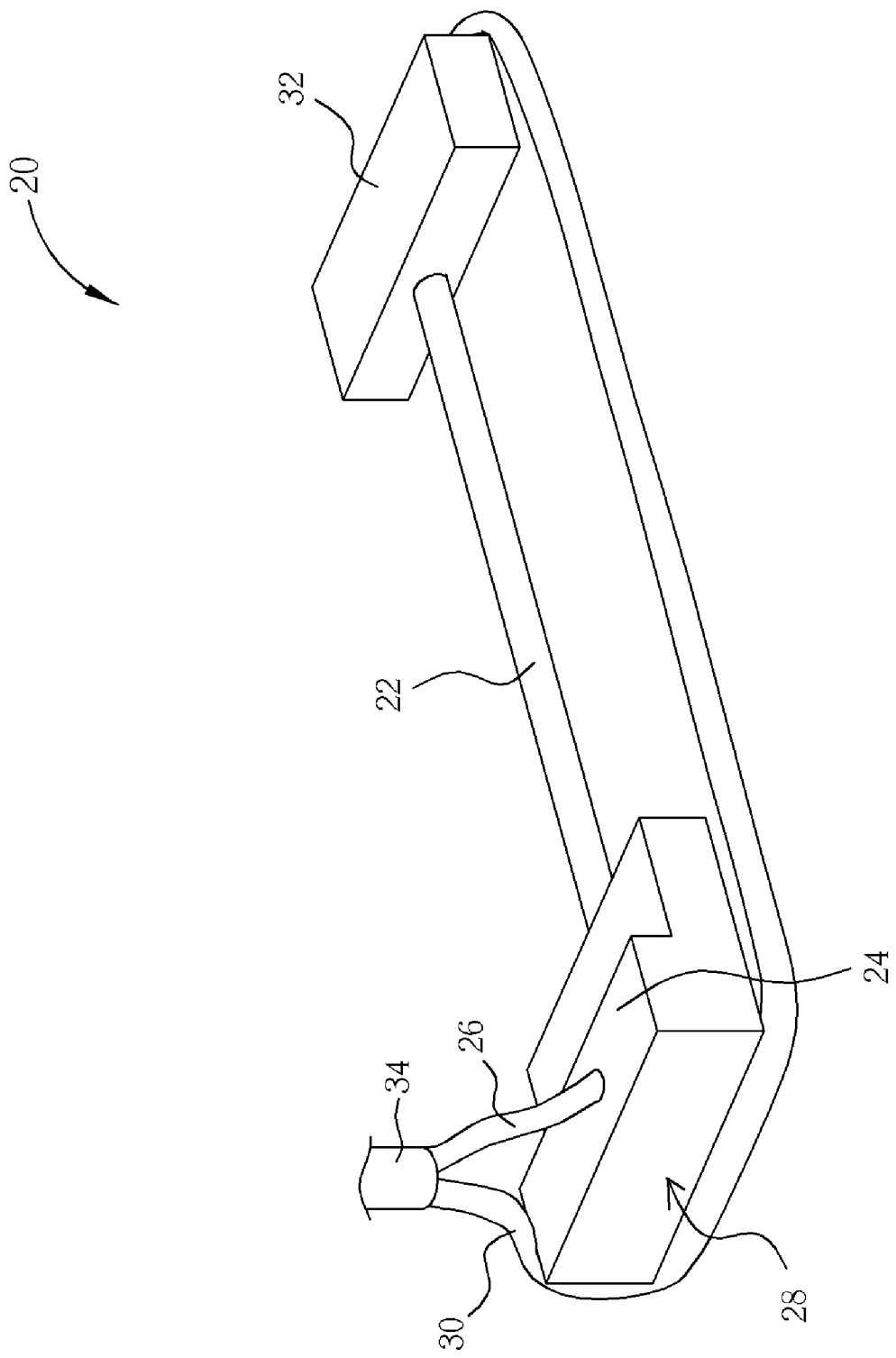
FIG. 2 is a perspective illustrating a lamp module of a backlight module according to the prior art.
Figure 3:
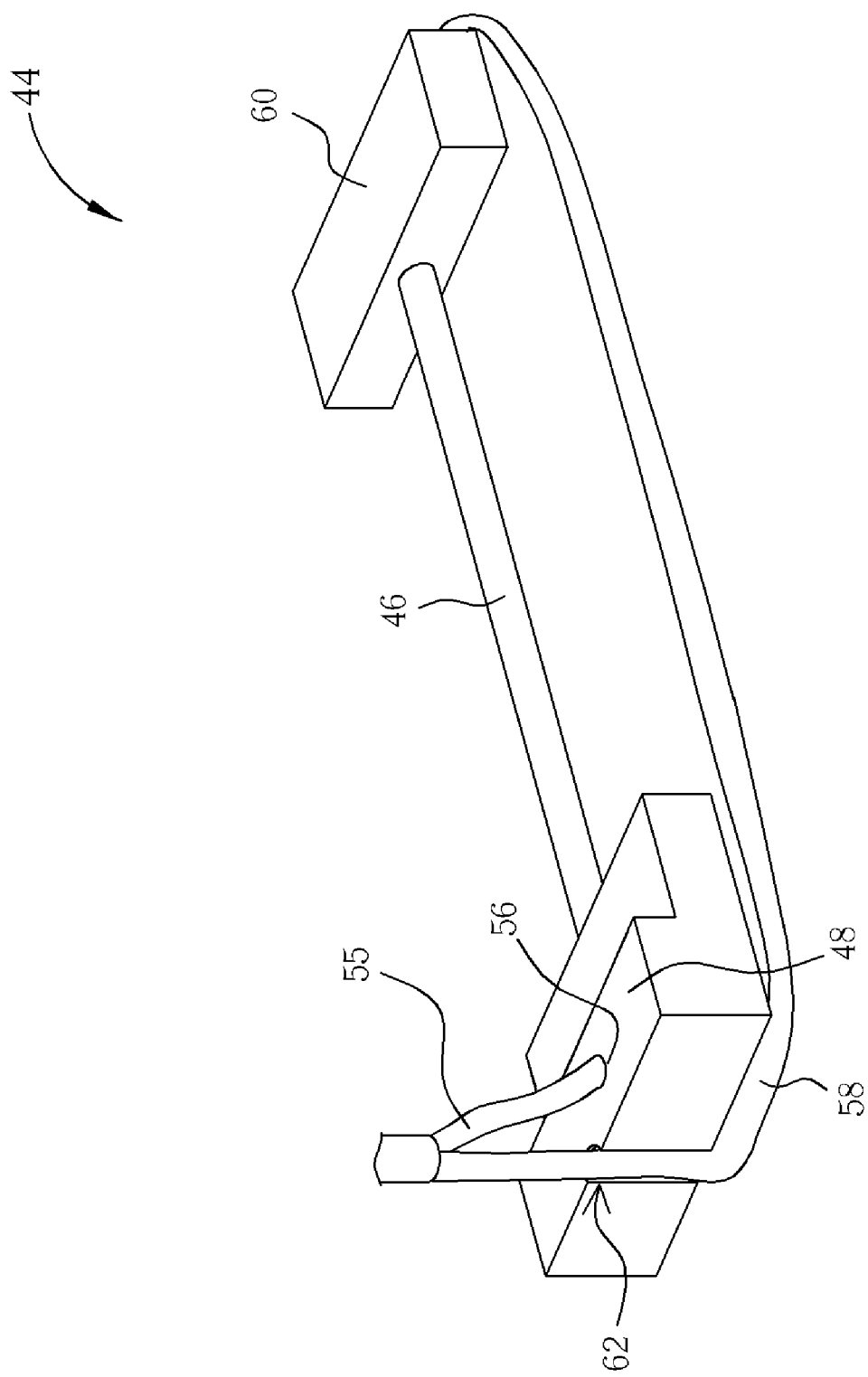
FIG. 3 is a perspective diagram illustrating a lamp module according to the preferred embodiment of the present invention.

Please refer to FIG. 3. FIG. 3 is a perspective diagram illustrating a lamp module 44 according to the preferred embodiment of the present invention. As shown in FIG. 3, the lamp module 44 includes a lamp 46 and a lamp holder 48 for supporting the lamp 46. The lamp 46 can be a cold cathode fluorescent lamp or an external electrode fluorescent lamp. Preferably, the single lamp design of the present embodiment is utilized in a direct type backlight module.

The lamp module 44 also includes a high voltage wire 55 electrically connected to a high voltage end 56 and a low voltage wire 58 electrically connected to a low voltage end 60 of the lamp 46. It should be noted that the lamp holder 48 includes a groove 62, in which the low voltage wire 58 is fixed in the groove 62 while extending from the low voltage end 60 to the high voltage end 56.

As shown in FIG. 3, the low voltage wire 58 of the lamp module 44 is fixed in the groove 62 corresponding to the center of the lamp 46, thus the low voltage wire 58 would now have a relatively shorter length with respect to the high voltage wire 55. By utilizing the groove 62 to accommodate and fix the low voltage wire 58 in place, the present invention is able to prevent the longer low voltage wire being pulled as commonly found in the conventional art.

Figure 4:
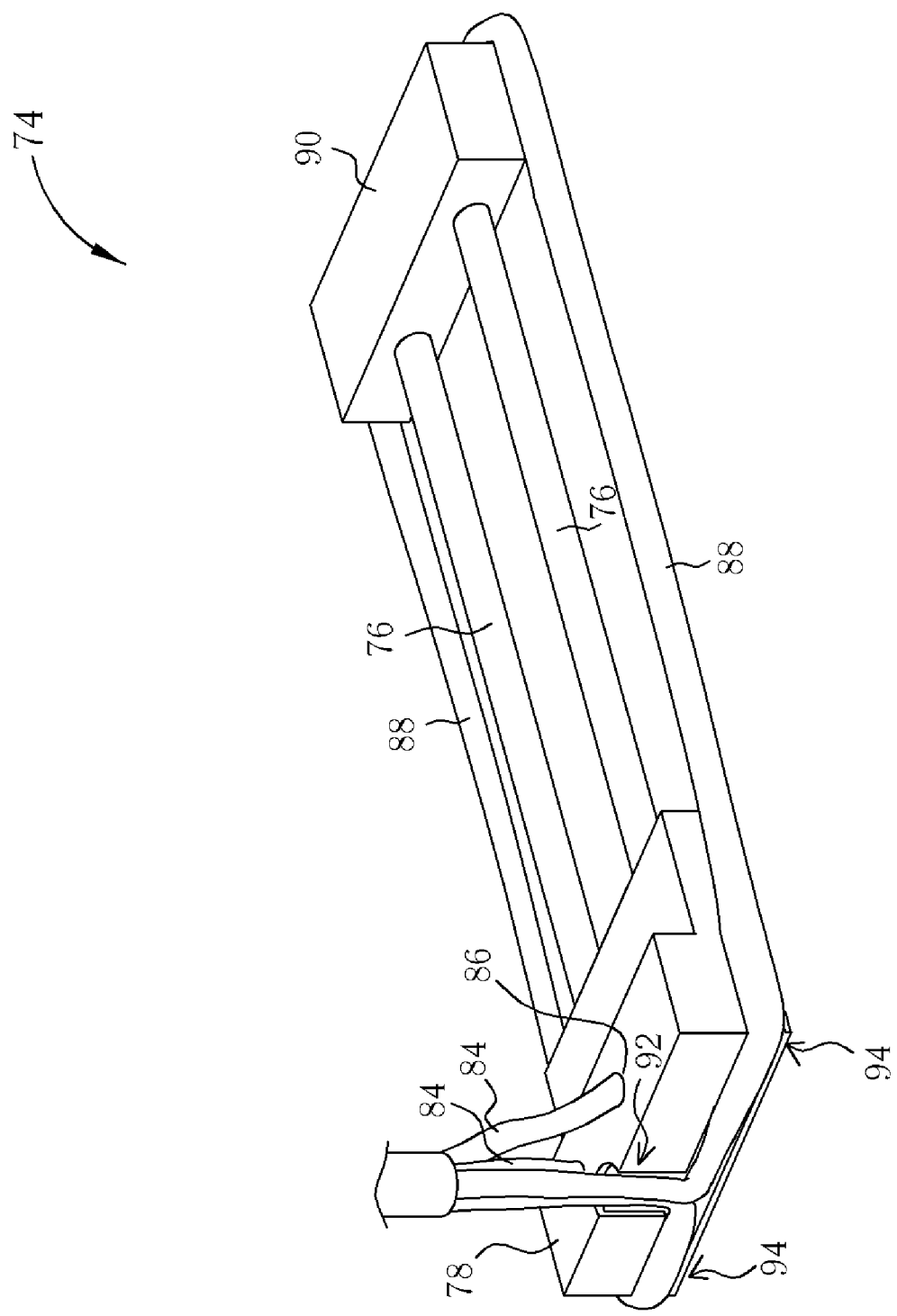
FIG. 4 and FIG. 5 are perspective diagrams illustrating a lamp module according to an embodiment of the present invention.
Figure 5:
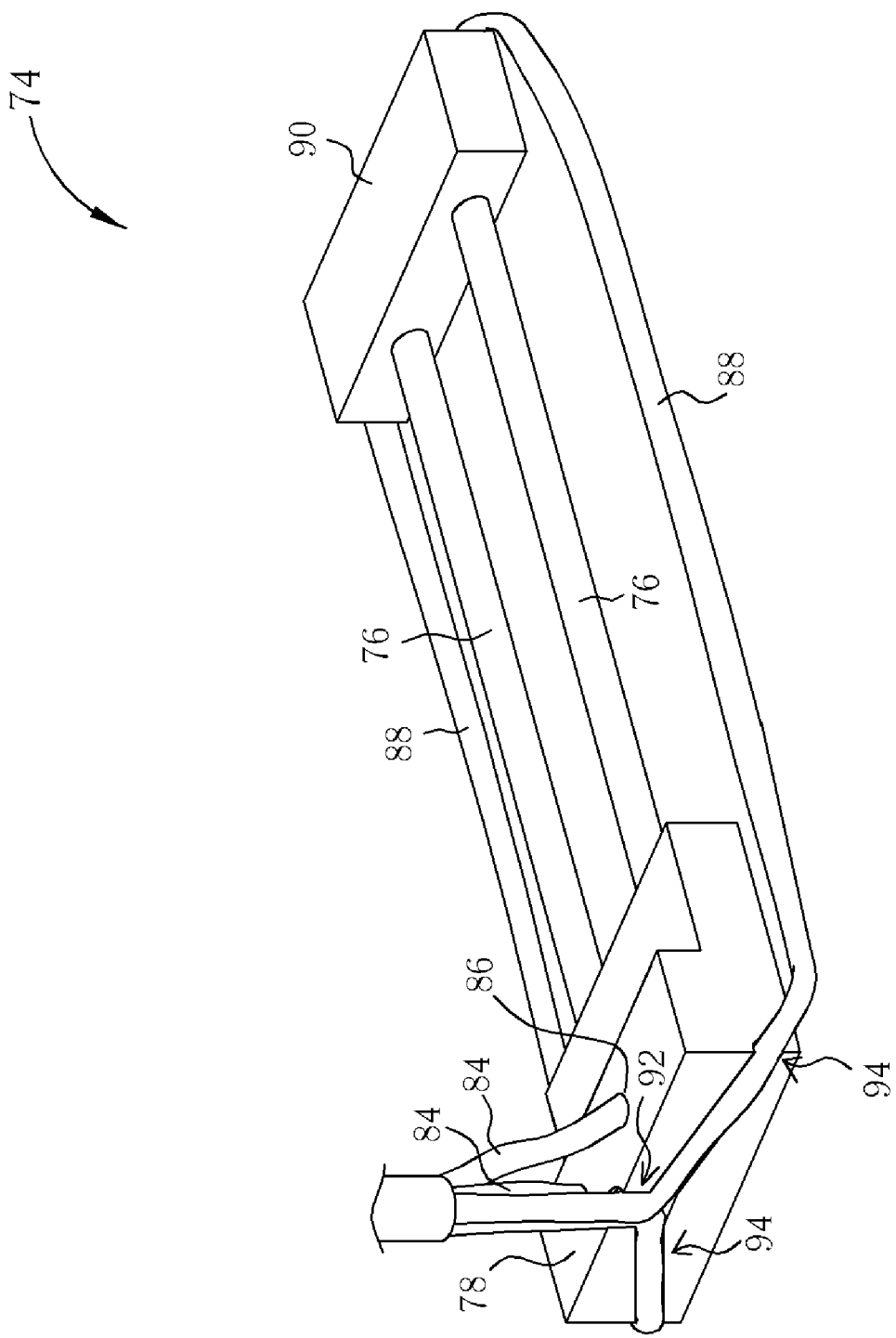

Additionally, the present invention can also be applied to a side-emitting type backlight module. Preferably, the side-emitting type backlight module will carry a lamp module having two or more lamps. Please refer to FIG. 4 and FIG. 5. FIG. 4 and FIG. 5 are perspective diagrams illustrating a lamp module 74 according to an embodiment of the present invention. As shown in FIG. 4 and FIG. 5, the lamp module 74 includes two lamps 76 and a lamp holder 78 for supporting the lamps 76. The lamps 76 can be cold cathode fluorescent lamps or external electrode fluorescent lamps.

Additionally, the lamp module 74 includes two high voltage wires 84 electrically connected to a high voltage end 86 of the lamps 76 and two low voltage wires 88 electrically connected to a low voltage end 90 of the lamps 76. In contrast to the previous embodiment, the lamp holder 78 includes a primary groove 92 and two secondary grooves 94. The two low voltage wires 88 are fixed in the primary groove 92 and the secondary grooves 94 while extending from the low voltage end 90 of the lamp 76 to the high voltage end 86.

In other words, if the lamp module 74 includes two lamps 76, thereby having two high voltage wires 84 and two low voltage wires 88, a primary groove 92 and two secondary grooves 94 can be formed in the lamp holder 78 for accommodating the low voltage wires 88. Preferably, the primary groove 92 can be formed according to a right angle with respect to the secondary grooves 94, as shown in FIG. 4. Alternatively, the primary groove 92 can be formed vertically, and the secondary grooves 94 can be formed according to a slanted manner, as shown in FIG. 5.

Figure 6:
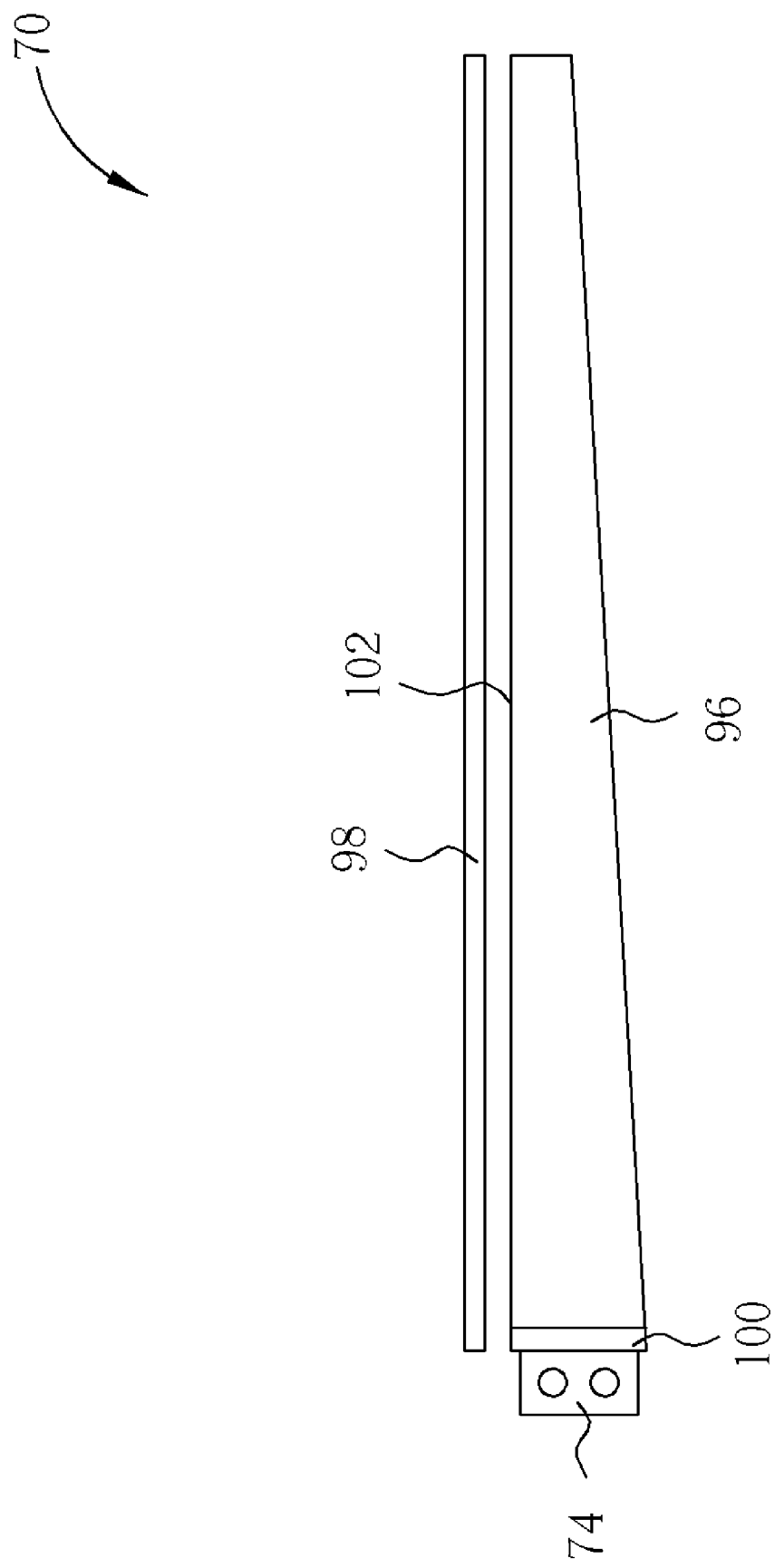
FIG. 6 is a perspective diagram illustrating a side-emitting type backlight module according to an embodiment of the present invention.

Please refer to FIG. 6. FIG. 6 is a perspective diagram illustrating a side-emitting type backlight module 70 according to an embodiment of the present invention. As shown in FIG. 6, the side-emitting type backlight module 70 includes a transparent light guide plate 96, an optical assembly 98, and a lamp module 74 utilized as a light source. One edge of the light guide plate 96 is a light-incidence plane 100, in which the light-incidence plane 100 serves to receive the light generated by the light source. Additionally, a light-exit plane 102 is formed on the top surface of the light guide plate 96, and a reflecting layer (not shown) is formed on the surface of the light guide plate 96 that is opposite to the light-incidence plane 100 and opposite to the light-exit plane 102, such that the light entering from the light-incidence plane 100 can only exit through the light-exit plane 102. The optical assembly 98 is disposed on the light-exit plane 102 of the light guide plate 96 for increasing the brightness and uniformity of the light produced. Preferably, the optical assembly 98 is consisting of diffuser films or prisms.

In contrast to the conventional backlight module, the present invention specifically forms a groove within the lamp holder of the backlight unit and utilize the groove to accommodate a low voltage wire of the lamp while the wire extends from a low voltage end to a high voltage end of the lamp, in which the low voltage wire is fixed corresponding to the central location of the lamp holder. By utilizing the design of the groove, the present invention is able to prevent the low voltage wire from being pulled during the assembly process, thereby reducing the chance of lamp breakage and malfunction of the display panel. The backlight module of the present invention can be applied to the fabrication of a liquid crystal display. For instance, the backlight module can be combined with a display panel to form a liquid crystal display, which is also within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display, comprising:
   a display pane; and
   a backlight module, disposed on one side of the display panel, the backlight module comprising:
   a plurality of lamps;
   a first wire, electrically connected to a first end of the lamps;
   a second wire, electrically connected to a second end of the lamps; and
   a lamp holder having a groove for supporting the lamp, the lamp holder comprises at least one primary groove and a plurality of secondary grooves, wherein the second wire is fixed in the primary groove and only a single one of the secondary grooves while extending from the second end of the lamp to the first end of the lamp.

2. The liquid crystal display of claim 1, wherein the lamp comprises a cold cathode fluorescent lamp or an external electrode fluorescent lamp.

3. The liquid crystal display of claim 1 further comprising a frame for accommodating the lamp holder.

4. The liquid crystal display of claim 3 further comprising an optical assembly positioned on one side of the lamp and fixed on the frame.

5. The liquid crystal display of claim 4, wherein the optical assembly is selected from the group consisting of light conducting structures, diffuser films, and prisms.

6. The liquid crystal display of claim 3 further comprising a reflector disposed on an inner surface of the frame.

7. The liquid crystal display of claim 1, wherein the first end is a high voltage end.

8. The liquid crystal display of claim 7, wherein the first wire is a high voltage wire.

9. The liquid crystal display of claim 1, wherein the second end is a low voltage end.

10. The liquid crystal display of claim 9, wherein the second wire is a low voltage wire.

* * * * *